(12) United States Patent
Hofmann et al.

(10) Patent No.: US 7,945,523 B2
(45) Date of Patent: May 17, 2011

(54) METHOD AND COMPUTER PROGRAM FOR ANALYZING VARIABLES USING PRUNING, INFLUENCING A COMBUSTION PROCESS IN A COMBUSTION CHAMBER, USING A TRAINABLE STATISTICAL MODEL

(75) Inventors: Reimar Hofmann, Munich (DE); Volkmar Sterzing, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 1228 days.

(21) Appl. No.: 10/574,171

(22) PCT Filed: Sep. 27, 2004

(86) PCT No.: PCT/EP2004/052319
§ 371 (c)(1),
(2), (4) Date: Mar. 30, 2006

(87) PCT Pub. No.: WO2005/033809
PCT Pub. Date: Apr. 14, 2005

(65) Prior Publication Data
US 2009/0240636 A1    Sep. 24, 2009

(30) Foreign Application Priority Data

Sep. 30, 2003 (DE) .................................. 103 45 440

(51) Int. Cl.
*G06F 15/18* (2006.01)
(52) U.S. Cl. ........................................................ 706/12

(58) Field of Classification Search .................... 706/12, 706/15, 16, 21; 436/106, 116, 118; 701/99–102
See application file for complete search history.

(56) References Cited

U.S. PATENT DOCUMENTS

| | | | |
|---|---|---|---|
| 5,333,240 A * | 7/1994 | Matsumoto et al. | 706/20 |
| 5,636,326 A * | 6/1997 | Stork et al. | 706/25 |
| 5,857,321 A | 1/1999 | Rajamani et al. | |
| 6,014,653 A * | 1/2000 | Thaler | 706/16 |
| 6,311,172 B1 | 10/2001 | Tresp et al. | |
| 6,374,593 B1 * | 4/2002 | Ziegner | 60/772 |
| 6,968,327 B1 * | 11/2005 | Kates et al. | 706/21 |
| 7,575,931 B2 * | 8/2009 | Steichen et al. | 436/118 |
| 2003/0104463 A1 | 6/2003 | Schuermann et al. | |
| 2003/0187567 A1 * | 10/2003 | Sulatisky et al. | 701/104 |
| 2003/0216855 A1 * | 11/2003 | Liang et al. | 701/114 |
| 2005/0282285 A1 * | 12/2005 | Radhamohan et al. | 436/55 |

FOREIGN PATENT DOCUMENTS

| | | |
|---|---|---|
| DE | 196 11 732 C1 | 4/1997 |
| DE | 101 34 093 A1 | 1/2003 |
| DE | 101 59 262 A1 | 6/2003 |

OTHER PUBLICATIONS

Setiono et al., Neural Network Pruning for Function Approximation, 2000, IEEE 0-7695-0619-4/00, pp. 443-448.*

(Continued)

*Primary Examiner* — David R Vincent

(57) ABSTRACT

The invention relates to sensitivity analysis of variables influencing a combustion process. A trainable, statistical model is trained in such a way that it describes the combustion process in the combustion chamber. The trained statistical model is used to determine the influence of the variables on said combustion process in the combustion chamber.

15 Claims, 10 Drawing Sheets

OTHER PUBLICATIONS

Eakle Douglas et al.; "Optimizing Combustion to reduce NOx and Improve Boiler Efficiency Using Constrained Empirical Optimization Based on Bayesian Models"; Proceedings of the 1998 Spring Technical Engine Division Fort Lauderdale US; 1997; pp. 87-92; vol. 30, No. 1; XP009042888; Fairfield.

J. Hermann, C. Hantschk, P Zangl, S. Gleis, D. Vortmeyer, J. Seume, N. Vortmeyer, W. Krause, A. Orthmann; "Aktive Instabilitätskontrolle an einer 170 MW Gasturbine"; VDI-Bericht No. 1313, 18; Aug. 28-29, 1997; pp. 337-344; Deutsch-Niederländischer Flammentag, TU Delft/NL.

Finn V. Jensen; "An Introduction to Bayesian Networks"; 1996; pp. 6-67, 99-131; UCL Press, Aalborg University, Denmark.

Sébastien M. Candel; "Combustion Instabilities Coupled by Pressure Waves and their Active Control"; Twenty-Fourth Symposium (International) on Combustion/The Combustion Institute, 1992; pp. 1277-1296; Sydney.

* cited by examiner

FIG 2

Input numbers of the variables

Fig. 200

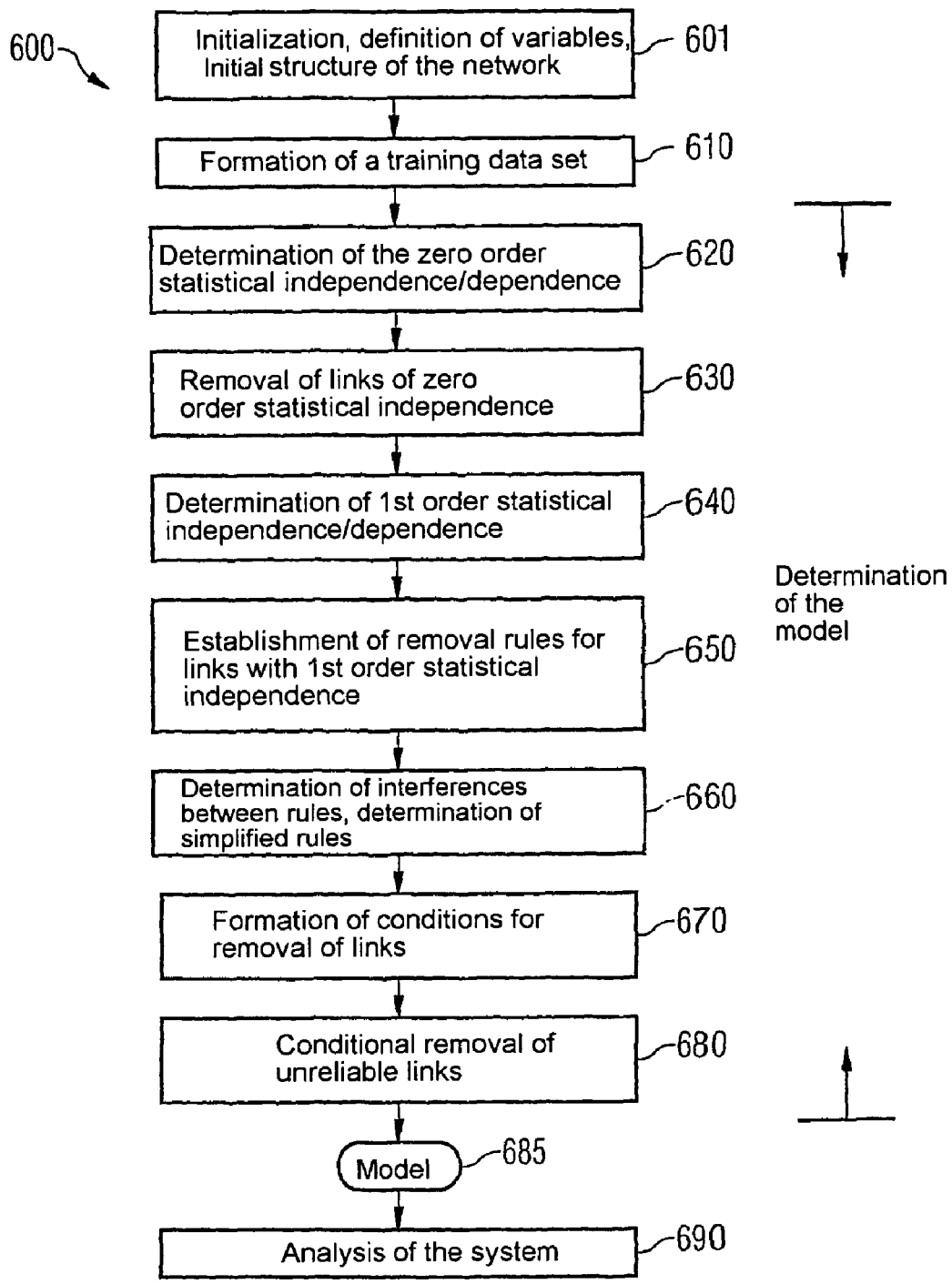

FIG 7

Tests:
- A(A,B)
- A(A,C)
- A(A,D)
- U(A,E)
- A(B,C)
- A(B,D)
- A(B,E)
- U(C,D)
- U(C,E)
- A(D,E) } 710
- U(A,C|B)
- U(A,D|B)
- U(B,C|A)
- U(B,E|D)
- U(D,E|B) } 711

Rules:
- remove(A,E)
- remove(C,D)
- remove(C,E)
- remove (A,C) if (B,C)
- remove (A,D) if (A,C)
- remove (B,C) if (D,E)
- remove (B,E) if (B,E)
- remove (D,E)

Rules after correspondence:
- remove (A,E)
- remove (C,D)
- remove (C,E)
- remove (A,C) if (B,C)
- remove (A,D) if (A,C)
- remove (B,C) if (D,E)
- remove (B,E) if (B,E)
- remove (D,E)

Identification of regions

- (A,B) and (B,C)
- (A,B) and (B,D)
- (A,B) and (A,C)
- (B,D) and (D,E)
- (B,D) and (B,E) } 712

- (B,C)
- (A,C)
- (D,E)
- (B,E) } 713

Resulting graph

A—701, B—702, D—704, C—703, E—705, 714

700

Result on Data of the Tapada Plant

2. Causal net detects dependancy structure of relevant variables

METHOD AND COMPUTER PROGRAM FOR ANALYZING VARIABLES USING PRUNING, INFLUENCING A COMBUSTION PROCESS IN A COMBUSTION CHAMBER, USING A TRAINABLE STATISTICAL MODEL

CROSS REFERENCE TO RELATED APPLICATIONS

This application is the US National Stage of International Application No. PCT/EP2004/052319, filed Sep. 27, 2004 and claims the benefit thereof. The International Application claims the benefits of German Patent application No. 10345440.3 DE filed Sep. 30, 2003. All of the applications are incorporated by reference herein in their entirety.

FIELD OF THE INVENTION

The invention relates to an analysis of variables influencing a combustion process in a combustion chamber.

BACKGROUND OF THE INVENTION

An analysis of variables influencing a combustion process in a combustion chamber is known from S. M. Candel, Combustion Instability Coupled by Pressure Waves and their Active Control.

In this analysis, linear methods, such as a regression analysis, are used in order to investigate dependences between the influencing variables and their influence on the combustion process.

However, as a combustion process taking place in a combustion chamber is a complex process observing non-linear dependences of influencing factors, such 'linear' analysis methods, such as from Candel, offer unreliable and insufficiently accurate results with regard to the influence of variables on the combustion process.

A further analysis of a combustion process is known from J. Hermann, et al., Aktive Instabilitätskontrolle an einer 170 MW Gasturbine, in this case a combustion process in a combustion chamber of a gas turbine, a so-called annular combustion chamber-gas turbine V84.3A.

Moreover, an occurrence of oscillations and/or pressure fluctuations during a combustion process in a combustion chamber of a gas turbine is known from J. Hermann, et al, in this case the annular combustion chamber-gas turbine V84.3A and damage to the combustion chamber caused by the resulting vibrations.

It is described in J. Hermann, et al that these oscillations and/or vibrations, so-called humming and/or combustion chamber humming, arise due to regenerative feedback from combustion processes taking place simultaneously in the combustion chamber of the gas turbine.

The vibrations cause an unstable flame front, which in turn causes increased heating of the combustion chamber. These can lead to damage to the combustion chamber of the gas turbine.

In order to be able to take suitable remedial action against the problem of combustion oscillations, in J. Hermann, et al the oscillation phenomenon is investigated in detail and possibilities for its removal, in particular active and passive methods, are compared and discussed.

J. Hermann, et al establishes and/or proposes to eliminate the damaging oscillations by constructive optimization of a combustion chamber geometry.

To counter possible repeatedly occurring oscillation problems where the operating capacity of the gas turbine is increased, J. Hermann, et al proposes an active instability control (AIC) based on an anticyclical modulation of a fuel flow.

However, AIC requires costly sensor and actuator technology which restricts its possibility of use.

It is further known that this damaging humming can also be reduced or avoided by reducing a load on the gas turbine, i.e. it is known that the load on a gas turbine has a great influence on combustion chamber humming and/or a high dependence or correlation with the (damaging) combustion chamber humming.

The reduction of the load to reduce or avoid damage to a combustion chamber of a gas turbine is, however, a possible solution which is only conditionally practicable.

As a rule, performance pledges are given by power station operators to their customers which, with a reduction in performance of the gas turbines, run the risk of not being fulfilled.

Consequently, it is important to be aware of further variables influencing the combustion process and/or the humming in addition to those of the load, the geometry and the fuel flow, for the reduction or prevention of damaging combustion chamber humming.

Generally, it is therefore desirable to ascertain with sufficient accuracy the influence of individual variables influencing the combustion process, in addition to dependences of variables influencing one another qualitatively and/or quantitatively.

This knowledge could, in particular, allow the general approach to the problem in the field of combustion processes to be solved and to be able to reduce more efficiently or more cost effectively the problem of combustion chamber humming especially by other influencing variables and/or suitable combinations of other variables.

Data Analysis by Using a Network

It is generally known to use networks made up of nodes and links in an area of data analysis, in order to identify and to describe complex data structures and dependences of data in the data structures.

Such a data analysis is known from DE 10159262.0 by using a network of the 'causal network' type.

Seen graphically, such a causal network is a statistical model of the data described thereby.

Such a causal network, such as from DE 10159262.0, is moreover particularly suitable for identifying and describing statistical properties of data, for example statistical dependence and/or independence between two variables.

Furthermore, from DE 10159262.0 a method for removing identifiable links from a network is known, a so-called Polynomial-Complexity-Method (PC method).

A data analysis by using a causal network, which is of the Bayesian and/or Bayes network W. Jensen, F. V. (1996), An introduction to Bayesian networks sub-type, is also known from DE 10159262.0.

In this data analysis by means of the Bayesian network, statistical dependences and/or statistical independences, generally statistical properties, between the data are determined (learned). The statistical properties of the data can then be graphically represented by using the network of nodes and links (FIG. 3).

FIG. 3 shows this graphical representation with the network 300 of nodes 310 and links 320. Two respective nodes 310 of the network 300 are connected to one another by a link 320.

A node 310 of the network 300 represents a datum (variable). A link 320 represents a statistical dependence between the nodes 310 and/or variables connected by this link 320. Unconnected nodes 310 are statistically independent of one another.

FIG. 4 shows diagrammatically a procedure 400 during a data analysis according to the PC method known from DE 10159262.0 which leads, for example, to the network structure 300 shown in FIG. 3.

The object of the data analysis is the determination of dependences and/or independences between data to be analyzed and a representation of the dependences and/or independences between the data, thus of a structure contained in the data, by means of a network structure and/or by means of a network.

A 'structure contained in the data' is generally understood to be a statistical dependence and/or a statistical independence between the variables.

The data for the data analysis are the variables v, w, x, y and z. Data tuples $(v, w, x, y, z)_i$ are given, where i=1 ... N (N=number of the predetermined data tuples).

During the analysis, a statistical dependence and/or independence between the variables v, w, x, y and z is determined.

FIG. 5 shows a network 500 made up of nodes A 510, B 511, C 512, D 513 and E 514 which represent the variables v, w, x, y and z.

In a first step 410 of the method 400 by using a statistical test method, a $\chi^2$-Test, which is described in $\chi^2$-Test, a statistical independence and/or statistical dependence is determined between two respective variables, for example (v,x), (x,z) or (v, y) (zero order statistical independence and/or dependence).

In a second step 420, from the network 500 which has an initial configuration where all nodes are connected to one another with links, such links 521 which connect two respective nodes, for example (A,E), (C,D) and (C, E), for whose associated variables a statistical independence was determined, for example (v,z), (x, y) and (x, z) are removed.

In a third step 430 for two respective variables, for which a statistical dependence has been determined, a conditional statistical dependence and/or independence is determined conditional on a third variable, for example (v, x|w), (v, y|w) or (w, x|v) (1st order statistical independence and/or dependence). In addition, the $\chi^2$-Test, which is described in $\chi^2$-Test is used.

In a fourth step 440 such links 522 in the network 500, which respectively connect two nodes, for example (A, C), (B, D) and (D, E) for whose associated variables a conditional statistical independence was determined, are removed.

According to the fourth step the network 500 has a structure (end configuration) which describes the statistical properties of the data.

Bayesian Network

A causal network, a Bayesian (Bayes) network is known from Jensen.

A Bayesian network B is a special form of representation of a common multivariate probability density function (pdf) of a number of variables X by means of a graphical model.

It is defined by a directed acyclic graph, (DAG) G, wherein each node i=1, ..., n corresponds to a random variable $X_i$.

The edges between the nodes represent statistical dependences and can be interpreted as causal relations between them. The second part of the Bayesian network is the number of conditional pdfs $P(X_i|Pa_i, \theta, G)$, which are parameterized by a vector $\theta$.

These conditional pdfs specify the type of dependences for the individual variables i from the number of their parents $Pa_i$. The common pdf can therefore be broken down into the product form $$P(X_1, X_2, \ldots X_n) = \prod_{i=1}^{n} P(X_i \mid Pa_i, \theta, G) \quad (1)$$

The DAG of a Bayesian network describes in an unequivocal way the conditional dependence- and independence relationships between a set of variables, although conversely a given statistical structure of the pdf does not result in an unequivocal DAG.

Instead it can be shown that two DAGs describe the same pdf, when and only when they have the same set of edges and the same set of 'colliders', whereby a collider is a constellation wherein at least two directed edges converge in the same node.

From DE 19611732 a further method is known for determining weights of a neural network suitable for removal and for removing weights from a neural network, a so-called pruning method.

SUMMARY OF THE INVENTION

An object of the invention is to provide a method which allows a more reliable and more accurate analysis of variables influencing a combustion process.

This object is achieved by the method, by the computer program with program code means and the computer program product for analyzing variables influencing a combustion process in a combustion chamber with the features according to the respective independent claims.

The method for the analysis of variables influencing a combustion process in a combustion chamber is based on the use of a trainable statistical model.

This trainable statistical model is trained at least by using predetermined values of the influencing variables (training data), whereby model parameters of the trainable, statistical model are altered and/or adapted.

The alteration and/or adaptation of the model parameters during training is carried out such that the trained, statistical model describes (models) the combustion process.

By using the trained statistical model and/or the altered, adapted model parameters, the influence of the variables on the combustion process can be analyzed.

In this connection, this analysis (based on the trained, statistical model and/or its adapted model parameters) allows both qualitative and quantitative statements about the influence of variables on the combustion process.

Dependences of the variables to one another, and influencing the combustion process individually and in combination, can be identified.

The variables can be ordered depending on the size of their influence on the combustion process. Insignificant variables can be identified.

Causal analyses for combustion process problems, effect analyses for predeterminable combustion process conditions, which can be described by predetermined values for the influencing variables and/or simulations and prognoses of combustion processes and/or combustion process conditions, can be carried out.

Moreover, during the analysis, cause-effect relationships during the combustion process can be revealed.

The computer program with program code means is set up to carry out all steps according to the method according to the invention, when the program is run on a computer.

The computer program product with program code means stored on a machine readable carrier is set up to carry out all steps according to the method according to the invention, when the program is run on a computer.

The computer program with program code means, set up to carry out all steps according to the method according to the invention, when the program is run on a computer, and the computer program product with program code means stored on a machine readable carrier, set up to carry out all steps according to the method according to the invention, when the program is run on a computer, are in particular suitable for carrying out the method according to the invention or one of its developments explained below.

Furthermore, it should be pointed out here that the method according to the invention may generally be used and/or transferred to other complex systems, such as industrial production processes, for example in the field of paper and/or steel production, energy production processes and/or energy production plants.

Moreover, it must be pointed out that the invention provides a general approach in order to allow and/or facilitate problem solving in the field of combustion processes.

Preferred developments of the invention are revealed in the dependent claims.

The developments described below refer both to the method and to the computer program and to the computer program product.

The invention and the developments described below can both be produced in software and in hardware, for example by using a special electrical circuit.

Moreover, an embodiment of the invention or a development described below is possible by means of a computer readable storage medium, on which the computer program with program code means is stored and which carries out the invention or the development.

Also, the invention or any development described below can be realized by a computer program product, which has a storage medium, on which the computer program with program code means is stored and which carries out the invention or development.

With the statistical trainable model, such as a neural network, the model parameters can be weights of the trainable statistical models. During training of such a model the weights are then adapted by using training data.

In a development, the variables comprise at least a few of the following variables and/or variables derived therefrom: external air pressure, gas pressure, pressure after compression, pressure difference at an air filter, pilot gas, pilot gas stream, load, air temperature, gas temperature, temperature after compression, pressure reduction in a combustion chamber, a 'blade' position (Schaufel), load, gas turbine output (GtLstg), air temperature inflow (SaugT), air pressure (UmgPr), pressure difference over an air filter (PrDFi), pressure after compression stage (VerPr), temperature after compression stage (VerdT), inlet guide blade position, pressure difference in combustion chamber (DrVBr), gas pressure (GasDr), gas temperature (GasT), rotational frequency, rotational speed (Drehzahl), exhaust gas temperature (AbgasT), first humming pressure amplitude (WD01), second humming pressure amplitude (WD02).

Furthermore, the influencing variables can comprise further variables for describing (further): fuel flows, fuel pressures, fuel temperatures or fuel flow ratios.

Moreover, it can be provided that the combustion process is described by using a variable describing combustion chamber humming, whereby the variables influencing this variable describing the combustion chamber humming can be graphically represented.

If, therefore, the combustion process is described by using a variable describing a NOx emission, for example, the variables influencing this variable describing the NOx emission are graphically represented.

It can also be provided that this variable describing the combustion chamber humming, like the aforementioned variable describing the NOx emission, is a target variable during training.

The trainable, statistical model can be realized in different ways, for example by means of a neural network, in particular by means of a feedforward neural network, or by means of a causal network, for example of the Bayesian network type, or by means of a decision tree.

The analysis of the influencing variables can be carried out by using a pruning method, whereby with the pruning method a so-called pruning of the model parameters is carried out.

It is provided in a development that the combustion chamber is a combustion chamber of a turbine, in particular a gas turbine.

It is further provided to use a development within the context of a sensitivity analysis for the variables influencing a combustion process of a combustion chamber.

A development can also be used to determine a sequence of the significance of variables on combustion chamber humming of a combustion chamber.

A development can further be used to determine a sequence of the significance of variables, in particular, the significance of variables influencing NOx emission of a combustion chamber.

BRIEF DESCRIPTION OF THE DRAWINGS

An embodiment of the invention which is described in more detail below is shown in the figures, wherein:

FIG. 2 shows an input data set with state vectors with variables influencing a combustion process in a combustion chamber of a gas turbine according to an embodiment;

FIG. 6 shows a method during an analysis of a 'combustion chamber' system based on determining a statistical model for the 'combustion chamber' system according to an embodiment;

FIG. 7 shows a simplified statistical model according to an embodiment;

DETAILED DESCRIPTION OF THE INVENTION

Figure 1:
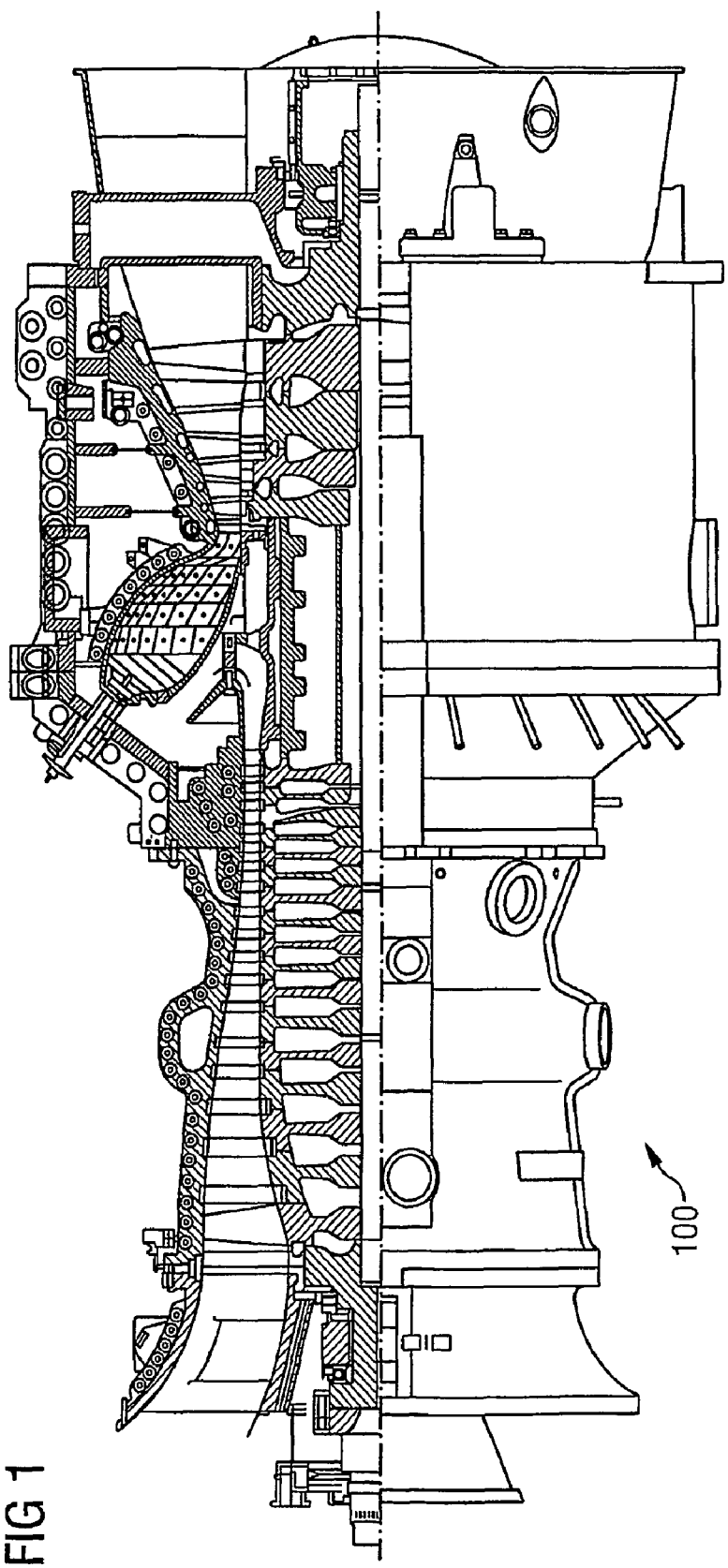
FIG. 1 shows a view of a combustion chamber of a gas turbine according to an embodiment.
Figure 3:
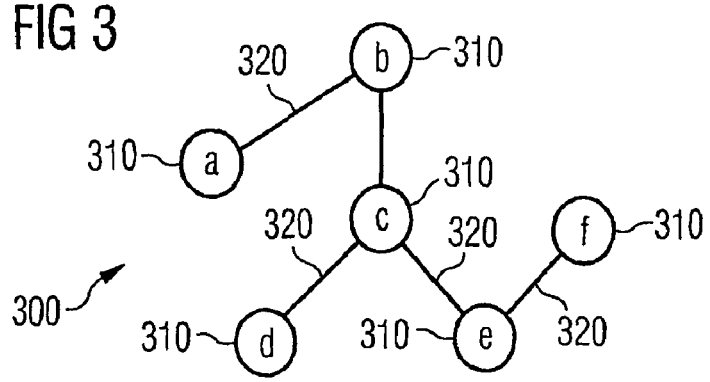
FIG. 3 shows a network made up of nodes and links.
Figure 4:
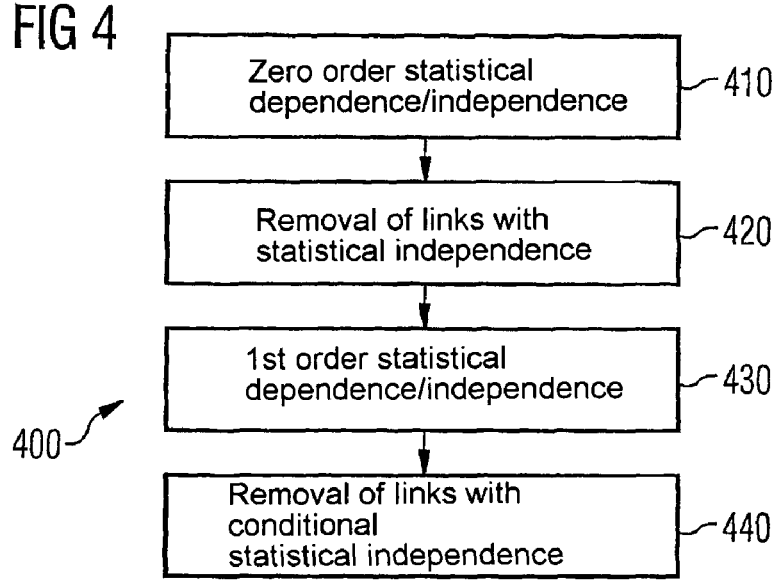
FIG. 4 shows method steps during a polynomial complexity method.
Figure 5:
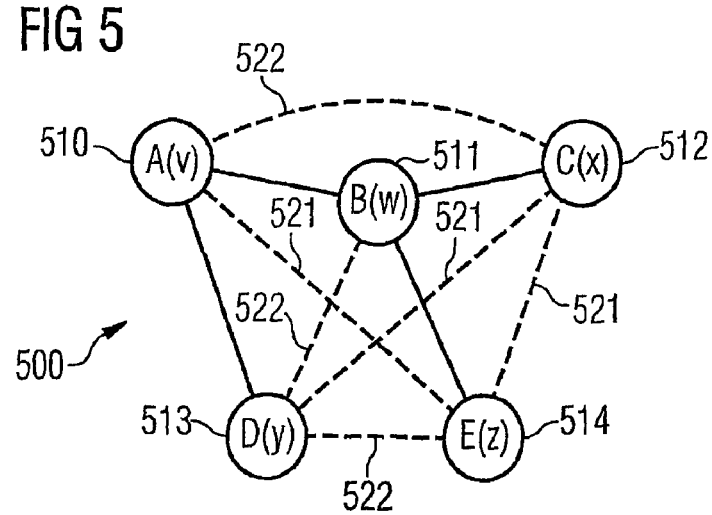
FIG. 5 shows a Bayesian network, which is processed by using a polynomial complexity method.

Exemplary embodiment: Analysis of a combustion process in a gas turbine combustion chamber FIG. 1 shows diagrammatically an annular combustion chamber—gas turbine 100 of a V84.3A series as is described in J. Hermann, et al.

In this annular combustion chamber—gas turbine 100 under certain operating conditions in the premix operation, 'humming' is exhibited due to self-excited combustion oscillations.

During combustion in sealed combustion chambers, feedback can result between the heat release of the flame and the acoustics in the combustion chamber. In this connection, because of fluctuations in the release of thermal power during combustion a sound field is created in the combustion chamber, which in turn causes further fluctuations in the combustion output. If the sound pressure and thermal power oscillations are sufficiently in phase, then a so-called Rayleigh criterion is fulfilled and this leads to self-excitation of the oscillations.

This phenomenon, known as self-excited combustion chamber or combustion oscillations, is often associated with very high sound pressure amplitudes and to considerably increased heat transfer to the combustion chamber walls which leads to increased mechanical and thermal stress of the system. The damage spectrum caused by the combustion chamber oscillations extends from increased noise emissions via reduction in output to damage of individual machine parts.

In order to be able to take suitable remedial action against the problem of combustion oscillations (combustion chamber humming), as occurs in the V84.3A, a combustion chamber process in the combustion chamber, referred to below as a 'combustion chamber system', is investigated and/or analyzed in depth.

Core points of the investigation and/or analysis determine combustion chamber states, for example by measuring combustion chamber states, input or reading of combustion chamber data from a memory and a subsequent statistical evaluation and analysis of the information determined carried out by means of a computer.

In the statistical evaluation, in a first case a statistical model, a causal network, is generally formed for the 'combustion chamber' system (modeling according to Case 1). In a second case a statistical model, a neural network of the feedforward type is formed for a 'combustion chamber humming' system—a type of special case of the general Case 1 of the 'combustion chamber' system (modeling according to Case 2).

The statistical models respectively form the basis of the following analyses.

Case 1: General Combustion Chamber Model (Combustion Chamber Model)

During measurement of a combustion chamber state, current parameter values are measured and stored in a memory of the computer in the form of a state vector. The same applies in the case of reading in or input of combustion chamber data.

Such a state measurement of parameter values is continuously repeated at intervals of 1 sec and/or for a predetermined time period, whereby a sequence of state vectors is generated.

These are collected and stored as data sets.

Figures 2, 200:
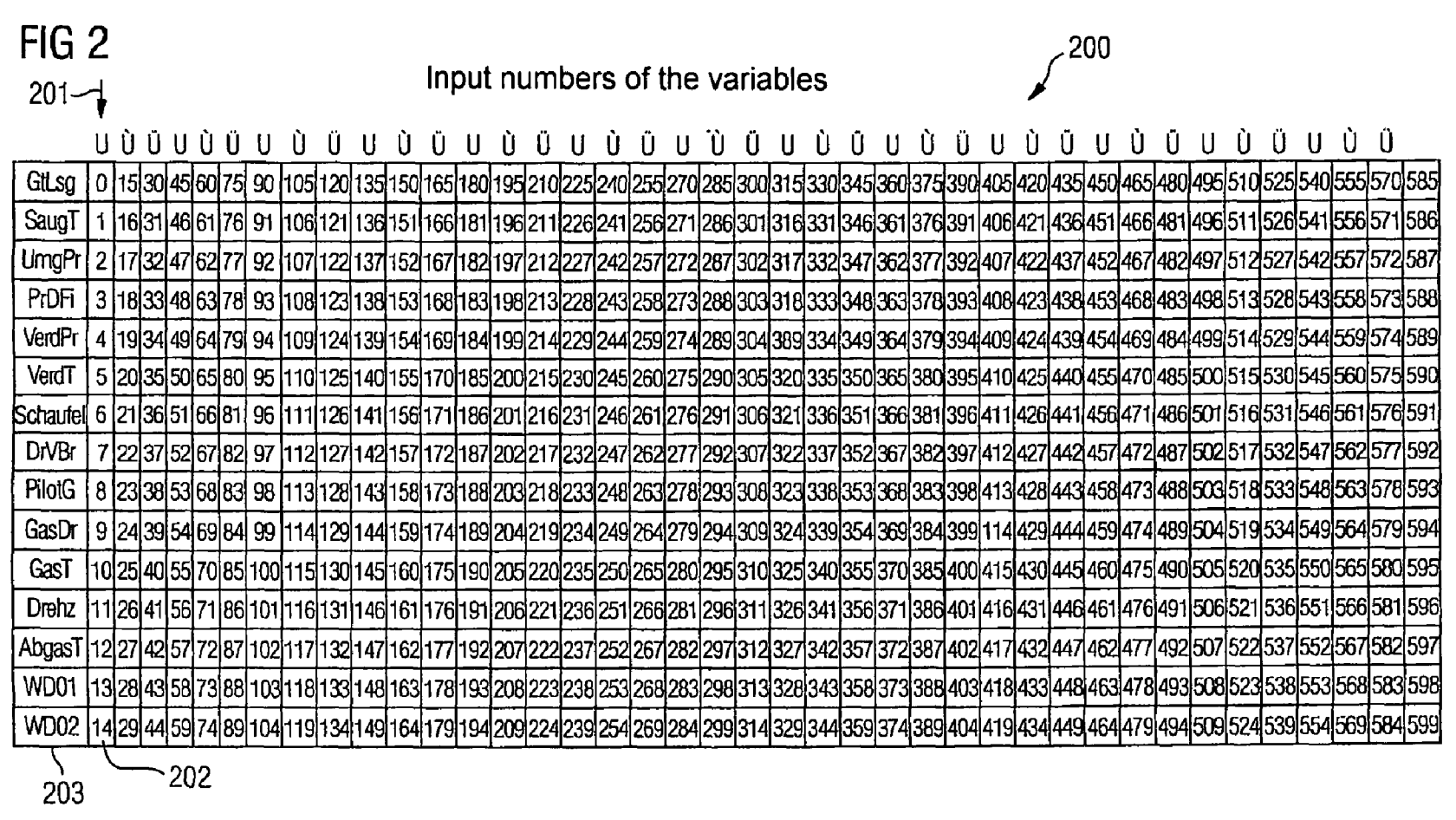

In FIG. 2 such a data set 200 is shown diagrammatically and/or in tabular form. FIG. 2 shows the data set 200 with a plurality of state vectors 201 each of which comprises the parameter values 202 of a measurement of a combustion chamber state.

A state vector comprises, for example, respectively the values of the following measurable parameters 203:
Gas turbine output (GtLstg)
Air temperature inflow (SaugT)
Air pressure (UmgPr)
Pressure difference over air filter (PrDFi)
Pressure after compression stage (VerdPr)
Temperature after compression stage (VerdT)
Blade (Schaufel)
Pressure difference in combustion chamber (DrVBr)
Pilot gas (PilotG)
Gas pressure (GasDr)
Gas temperature (GasT)
Rotational speed (Drehz)
Exhaust gas temperature (AbgasT)
WD01 (first alternating pressure amplitude)
WD02 (second alternating pressure amplitude)

It is worth noting that the above list of parameters is understood not to be definitive. A state vector 201 can also comprise further or even fewer or even derived parameters and/or parameter values.

For modeling the 'combustion chamber' system, in particular for verification and analysis of variables influencing the combustion process and for detecting statistical properties which the variables of the 'combustion chamber' system have in common, are defined by using the parameter variable of the 'combustion chamber' system. These should describe as comprehensively as possible a combustion chamber state and/or the combustion process (see FIG. 6, method step 601).

As described below, statistical dependences and/or independences between the variables are determined (see FIG. 6, method steps 610 to 680).

By using these statistical variables, a statistical model, a so-called Bayesian network Jensen of the 'combustion chamber' system is determined (see FIG. 6, 690).

By using the statistical model 685 and/or the Bayesian network 685, subsequently a further analysis of the 'combustion chamber' system and thus of a combustion process is carried out (see FIG. 6, Method step 690).

FIG. 6 shows method steps 601 to 680 which are carried out when determining a statistical model of the 'combustion chamber' system 685:

In an initialization step 601 the variables of the 'combustion chamber' system are established.

The defined variables of the 'combustion chamber' system are:
Gas turbine output (GtLstg)
Air temperature inflow (SaugT)
Air pressure (UmgPr)
Pressure difference over air filter (PrDFi)
Pressure after compression stage (VerdPr)
Temperature after compression stage (VerdT)
Blade (Schaufel)
Pressure difference in combustion chamber (DrVBr)
Pilot gas (PilotG)
Gas pressure (GasDr)
Gas temperature (GasT)
Rotational speed (Drehz)
Exhaust gas temperature (AbgasT)
WD01
WD02
and coincide in this case with the measurable parameters 203.

It is to be emphasized that this correspondence does not necessarily always have to be provided. The set of variables and/or influencing variables as above can be a portion of the measurable parameters 203 or even (at least in part) be obtained by combining specific parameters 203.

This list of variables is understood not to be definitive. Further variables can be defined which describe the 'combustion chamber' system.

The variables are combined into a so-called model state vector, whereby the components of the model state vector are the variables.

In the initialization step 601 an initial structure of a network is further determined which is constructed from nodes and links and which describes a structure which is contained in the 'combustion chamber' system.

The number of nodes is established according to the number of variables of the 'combustion chamber' system. Each node represents a variable of this system.

In the initial structure all nodes are linked together which signifies a dependence between all variables, adopted initially and to be verified later.

In a first step 610 a so-called training data set of the 'combustion chamber' system is determined. By using this training data set the network is processed and/or trained as described below such that an end structure of the network describes a structure contained in the 'combustion chamber' system.

In addition, from a predetermined data set, model state vectors are extracted and combined into a training data set 610.

This is very easily formed in this case as the parameters coincide with the variables, i.e. the state vector coincides with the model state vector.

In a second step 620, by using a statistical test method, a $\chi^2$-Test, which is described in [5] and the training data set (see step 610) detects a direct statistical independence and/or direct statistical dependence respectively between two variables of the system (zero order statistical independence and/or dependence).

The following is determined:
U/A (Pilot gas PilotG, Gas pressure GasDr)
U/A (Pilot gas PilotG, NOx)
U/A (Pilot gas PilotG, Rotational speed Drehz)
U/A (Pilot gas PilotG, Gas temperature GasT)
etc.
whereby the statistical independence U and/or the statistical dependence A between the variables a and the variables b is denoted by U/A(a,b).

In a third step 630 such links which link two respective nodes and for whose corresponding variables a statistical independence U is determined, are removed from the network which comprises the initial configuration.

In a fourth step 640 for two respective variables, for which a statistical dependence has been determined, a conditional statistical dependence and/or independence is determined conditional on a third variable (1st order statistical independence and/or dependence).

In addition the $\chi^2$-Test, which is described in [5], is used.
The following are determined:
U/A(Pressure difference in combustion chamber DrVBR, Gas pressure GasDr|Pilot gas PilotG),
U/A(Pilot gas PilotG, Temperature after compression stage VerdT|Blade Schaufel),
U/A(Pilot gas PilotG, NOx|Air pressure UmgPr),
U/A(Gas turbine output GtLstg, Temperature after compression stage VerdT|Air temperature inflow SaugT),
etc.,
whereby the statistical independence U and/or the statistical dependence A between the variables a and the variables b conditional on the variable c is denoted by U/A(a,b|c).

In a fifth step 650, rules are formulated for such links, for whose corresponding nodes a conditional statistical independence U has been determined (see U(a,b|c) step 640) for a removal of these links.

Referring to a simpler further example shown below and shown in FIG. 7, this method is to be clarified for a network 700 with nodes A (701), B (702), C (703), D (704) and E (705) which represent the variables v, w, x, y and z:

The following direct statistical independences and dependences were determined and the corresponding links in the network removed (710):
  a) direct statistical independences (see step 620 and 630):
  U(A,E) link (A,E) removed,
  U(C,D) link (C,D) removed,
  U(C,E) link (C,E) removed;
  direct statistical dependences (see step 620):
  A(A,B), A(A,C), A(A,D), A(B,C), A(B,D), A(B,E), A(D,E).

The following conditional statistical independences were determined and the following rules for a removal of links formulated (711):
  a) U(A,C|B);
  the corresponding rule is:
  remove link (A,C), if link (A,B) and link (B,C) are present in the network
  U(A,D|B);
  the corresponding rule is:
  remove link (A,D), if link (A,B) and link (B,D) are present in the network
  U(B,C|A);
  the corresponding rule is:
  remove link (B,C), if link (A,B) and link (A,C) are present in the network
  U(B,E|D);
  the corresponding rule is:
  remove link (B,E), if link (B,D) and link (D,E) are present in the network
  U(D,E|B);
  the corresponding rule is:
  remove link (D,E), if link (B,D) and link (B,E) are present in the network In a sixth step 660 an interference is identified in the rules. By simplifying the rules this interference is removed. As a result, new simplified rules are formulated.

The following simplified rules result (712) for the above further example:
  a) U(A,C|B);
  the corresponding rule is:
  remove link (A,C), if link (B,C) is present in the network
  U(A,D|B);
  the corresponding rule is:
  remove link (A,D)
  U(B,C|A);
  the corresponding rule is:
  remove link (B,C), if link (A,C) is present in the network
  U(B,E|D);
  the corresponding rule is:
  remove link (B,E), if link (D,E) is present in the network
  U(D,E|B);
  the corresponding rule is:
  remove link (D,E), if link (B,ED) is present in the network In a seventh step 670, from the simplified rules, conditions for the removal of links are determined. Links which are only deleted from the network under such a condition are denoted as so-called unreliable links.

The following unreliable links (713) result for the above further example:
  a) unreliable link (A,C) with the condition:
  remove link (A,C), if link (B,C) is present in the network
  unreliable link (B,C) with the condition:
  remove link (B,C), if link (A,C) is present in the network unreliable link (B,E) with the condition:
remove link (B,E), if link (D,E) is present in the network
unreliable link (D,E) with the condition:
remove link (D,E), if link (B,E) is present in the network In an eighth step 680 the unreliable links are 'conditionally removed' from the network, i.e. the unreliable links are identified in the network, for example by means of a dotted link 714, whereby the dotted link means that this link is possibly not present (if the corresponding condition is fulfilled in the network and thus this unreliable link has been deleted)

or that this link is present (if the corresponding condition is not fulfilled in the network and thus this unreliable link has not been deleted).

Thus by means of this method a plurality of different conditional end structures result for the network, which in their entirety describe the structure present in the data better and more flexibly than would be possible with only one single reliable end structure.

Figure 8:
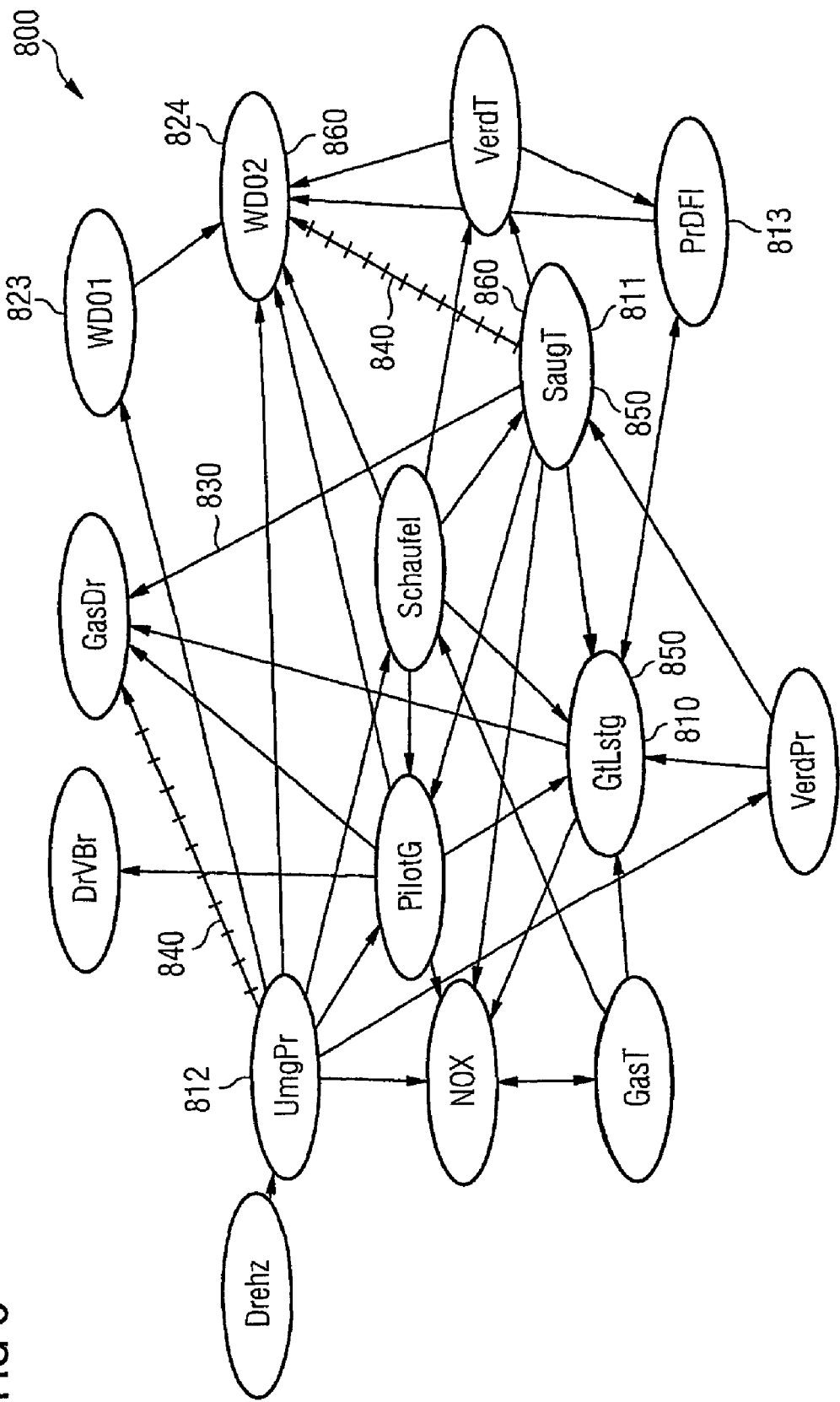
FIG. 8 shows different, conditional end structures of a network, which describe the 'combustion chamber' system, according to an embodiment.

In FIG. 8 the different conditional end structures of the network 800 which describes the 'combustion chamber' system are shown.

Figure 11:
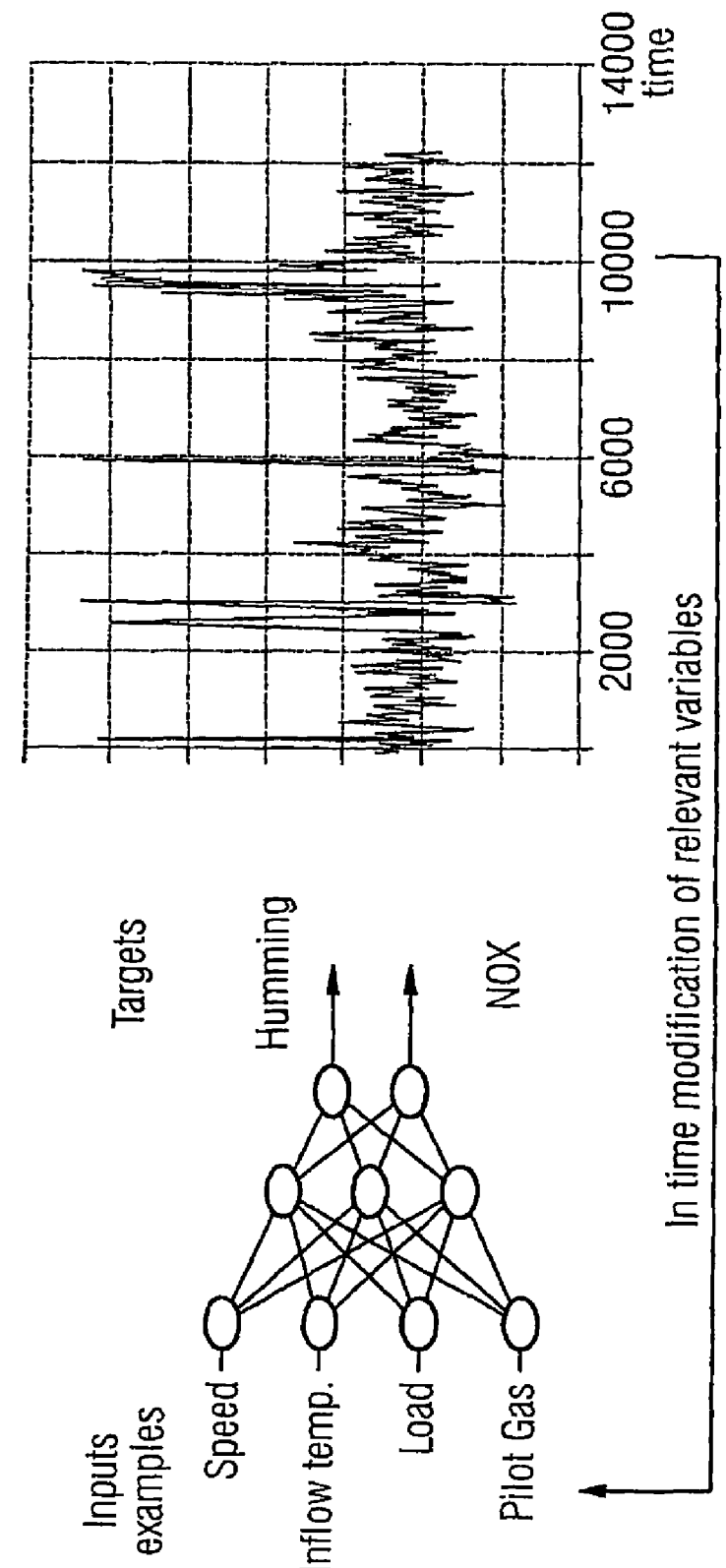
FIG. 11 shows a method for identifying significant variables influencing combustion chamber humming.

The variables are shown as nodes 810 to 824 in FIG. 8:
Gas turbine output (GtLsg) 810
Air temperature inflow (SaugT) 811
Air pressure (UmgPr) 812
Pressure difference over air filter (PrDFi) 813
Pressure after compression stage (VerdPr) etc.
Temperature after compression stage (VerdT)
Blade (Schaufel)
   Pressure difference in combustion chamber (DrVBr)
   Pilot gas (PilotG)
   Gas pressure (GasDr)
   Gas temperature (GasT)
   Rotational speed (Drehz)
   Exhaust gas temperature (AbgasT)
   WD01
   WD02
   The end structures and/or the network 800 have:
   reliable links 830, which link two respective nodes 850 without a corresponding condition,
   unreliable links 840 which respectively conditionally link two nodes 860.
Not present in the network 800 is
a node which is not linked to any other node
Case 2: 'Combustion Chamber Humming' Model (FIG. 11)

According to the above method with the combustion chamber model, a model, the combustion chamber humming model, is now developed which in particular is suitable for investigating and analyzing the phenomenon of combustion chamber humming [2].

This combustion chamber humming model allows an identification of important variables connected with the problem of combustion chamber humming [2] in a generally applicable and targeted manner.

In addition, the combustion chamber humming model allows the evaluation of the effect of targeted alterations of these variables.

As a result, counter measures can be developed, without intervention in the real system modeled by the model and/or the turbine, which effectively reduce turbine humming and do not include reducing the load and power output.

Proceeding from the above variables and/or training data set, such model state vectors, wherein the turbine exhibits humming, are selected and combined into a further second training data set used in Case 2.

By using this second training data set a neural network of the feedforward type is formed and/or trained for a future amplitude of the combustion chamber humming (or a further parameter corresponding to the humming).

Target variables during training are humming and NOx emission.

By means of a so-called pruning [6] of model parameters, in this case of the weights of the neural network, the influence of each variable for the combustion chamber humming model is evaluated. Conclusions are drawn from the evaluation about the significance of the respective variable for the model.

If the variables are sorted according to this significance, accordingly, the sequence of the significance of the variables is also obtained for the occurrence of the turbine humming itself.

With the pruning of the model parameters, the neural network achieves a high generalization capacity in periods of humming, which were not contained in the training data set.

Developments and alternatives to the embodiment are described hereinafter.

1) Case 3: Combustion Chamber Humming Model in Combination with Combustion Chamber Model.

The combustion chamber humming model according to Case 2 describes the turbine with an operating policy at a given time. This cannot, however, be sufficient to predict what the effect of alterations to this operating policy is and/or which alterations can be undertaken in order to prevent turbine humming.

It can be concluded therefrom that the combustion chamber humming model based on the neural network of the feedforward type does not contain a cause-effect-direction of connections and does not differentiate between direct and indirect dependences.

Therefore in Case 3 in a first step, the combustion chamber humming according to Case 2 is modeled and, as a result, the most significant variables and/or variables influencing the turbine humming are identified.

With the identified, most significant variables a second step is carried out wherein the dependences between the most significant variables identified in the first step are modeled together and with regard to the occurrence of humming.

The object of this modeling is the identification of cause-effect-connections or direct and indirect dependences and/or direct and indirect variables.

The interpretation of these dependences, therefore, allows the optimal identification of influencing variables, in particular the direct variables by whose alteration humming can be immediately counter controlled.

Figure 12:
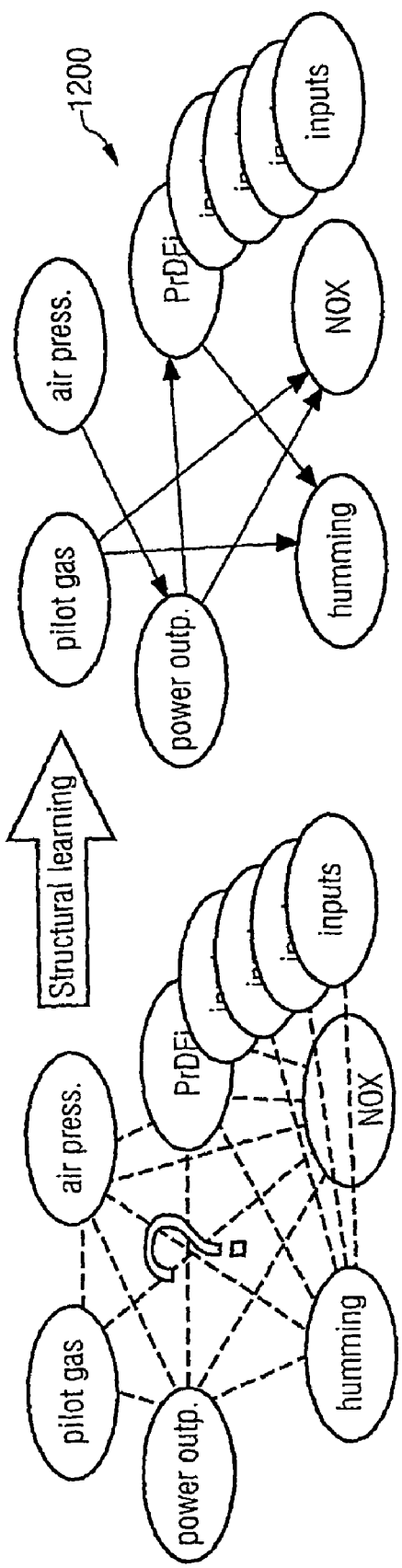
FIG. 12 shows a method for identifying dependences of influencing variables.

In addition, in the second step a modeling according to Case 1 is carried out, i.e. a causal network is trained (FIG. 12) with a training data set comprising only the most important influencing variables identified according to step 1.

The network structure 1200 present after the training discloses the desired direct and indirect dependences and/or direct and indirect influencing variables.

It is worth noting that during the second step, methods can be used based on the theory of graphical models.

Case 4

In carrying out Case 3, a modeling according to Case 2 can be carried out, i.e. a modeling by using a neural network of the feedforward type, proceeding from the direct variables identified according to Case 3.

By means of the neural network thus created, effects of alterations of the direct variables identified according to Case 3 can be determined.

As a result, without experiments on the turbine or before their commencement, the effects of counter measures against humming can be estimated.

The effective counter measures or combinations thereof are identified, evaluated and prepared.

Figure 9:
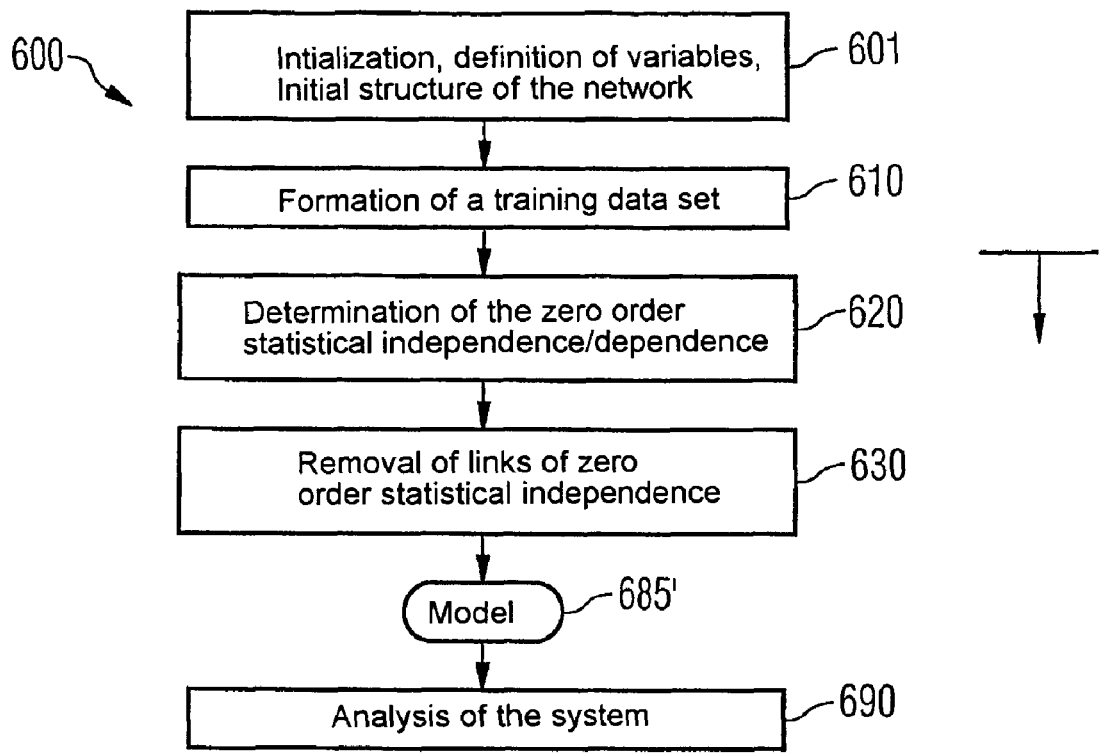
FIG. 9 shows a method during an analysis of a 'combustion chamber' system based on a simplified determination of a statistical model of the 'combustion chamber' system according to an alternative embodiment.

In an alternative (see FIG. 9 and FIG. 10) to Case 1 of the embodiment, a simplified network structure 1000 (685') is determined which has no unreliable links.

In this case, only the direct statistical independences and/or direct statistical dependences between two respective variables of the system are determined (see 620, zero order statistical independence and/or dependence).

The required statistical dependences and/or independences are no longer determined here (see 640, 1st order statistical independence and/or dependence).

Thus only the described method steps 601, 610, 620 and 630 are carried out which leads to the simplified network structure 685' and/or 1000.

Figure 10:
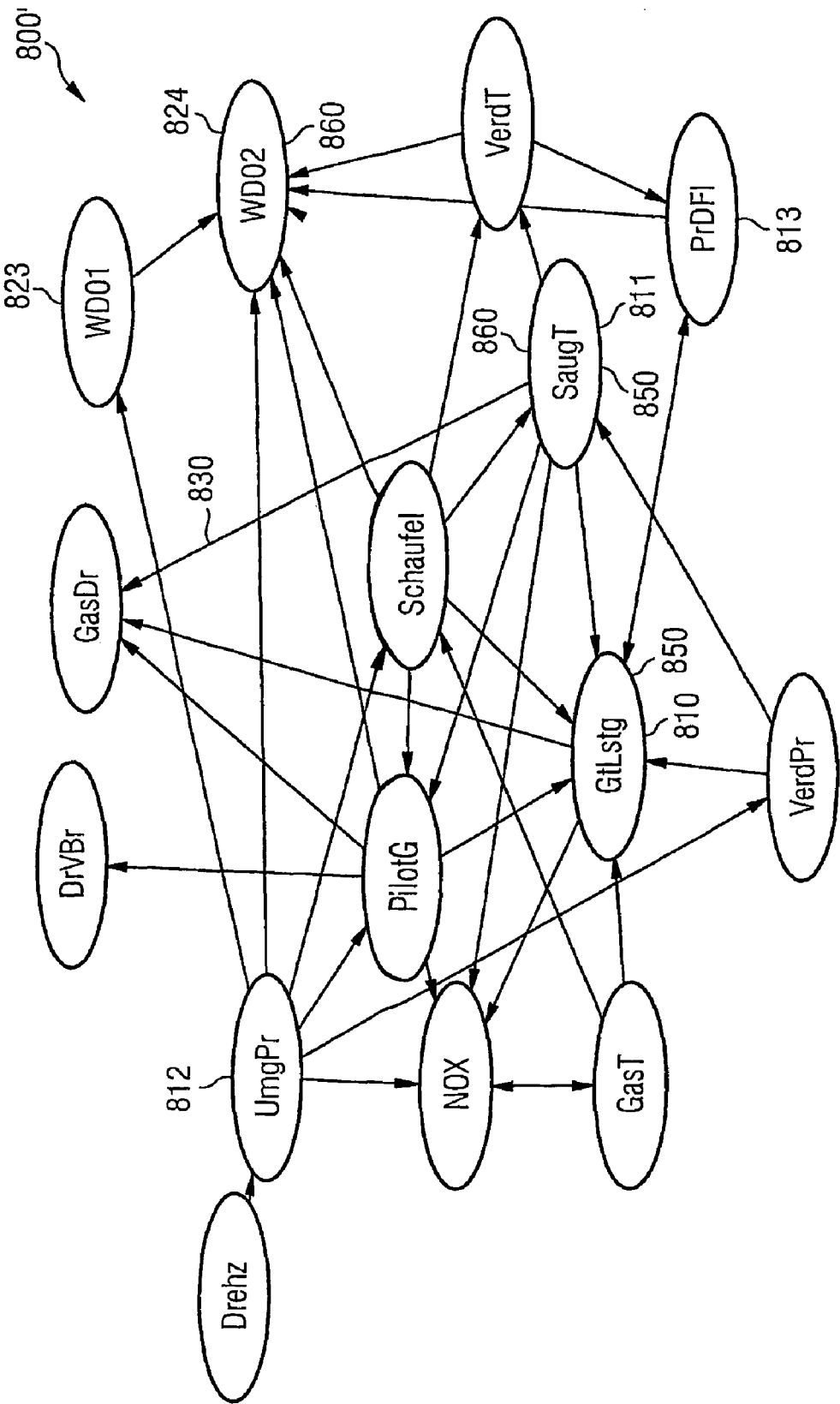
FIG. 10 shows a simplified end structure of a network, which describes the 'combustion chamber' system, according to an alternative embodiment.

In FIG. 10 the end structure of the network 800', which describes the 'combustion chamber' system, is shown. The variables are nodes 810 to 824, as in FIG. 8:
Gas turbine output (GtLsg) 810
Air temperature inflow (SaugT) 811
Air pressure (UmgPr) 812
Pressure difference over air filter (PrDFi) 813
Pressure after compression stage (VerdPr) etc.
Temperature after compression stage (VerdT)
Blade (Schaufel)
  Pressure difference in combustion chamber (DrVBr)
  Pilot gas (PilotG)
  Gas pressure (GasDr)
  Gas temperature (GasT)
  Rotational speed (Drehz)
  Exhaust gas temperature (AbgasT)
  WD01
  WD02

The end structure and/or the network 800' has:
reliable links 830, which respectively link two nodes 850 without a corresponding condition.
Not present in the network 800' is
a node which is not linked to any other node.
Unreliable links 840 which conditionally link two respective nodes 860 are also not present.

In a second alternative to Case 1 of the embodiment, links suitable for removal and/or weights of a neural network suitable for removal by means of a so-called pruning method are determined.

In this document reference is made to the following publications:

[1] S. M. Candel, Combustion Instability Coupled by Pressure Waves and their Active Control, Invited General Lecture, 25. Int. Symp. On Combustion, Sydney, 1992;

[2] J. Hermann, et al., Aktive Instabilitätskontrolle an einer 170 MW Gasturbine, VDI-Bericht Nr. 1313, 18 (Active Instability Control in a 170 MW Gas turbine, VDI-Report No. 1313, 18.) Deutsch-Niederländischer Flammentag, TU Delft/NL, 28-29 Aug. 1997;

[3] Patent application with the publication number DE 10159262.0, internal reference number 2001P12478DE;

[4] F. W. Jensen, F. V. (1996), An introduction to Bayesian networks, UCL Press, London; 178 pages;

[5] $\chi^2$-Test;

[6] Patent application with the publication number DE 19611732, internal reference number 1996P01284DE.

The invention claimed is:

1. A method for analyzing variables influencing a combustion process in a combustion chamber, comprising:
training a statistical model using predetermined values of influencing variables;
altering parameters of the model such that the model describes the combustion process; and
determining the influence of the altered parameters on the combustion process,
wherein the model parameters are weights of the model,
wherein the variables are analyzed by a pruning method and a pruning of the model parameters is performed during the pruning method, and
wherein the pruning method comprising:
  representing each of the influencing variables by a node,
  providing a link between each of the nodes,
  determining a zero order statistical independence and dependence between two of the nodes,
  removing the link between the two nodes when a zero order statistical independence is determined between the two of the nodes;
  removing a link between a first node and a second node based on a first order statistical independence such that the link between the first node and the second node is removed when the first node is linked to a third node and the second node is linked to the third node.

2. The method according to claim 1, wherein the influencing variables are selected from the group consisting of: external air pressure, gas pressure, pressure after compression, pressure difference at air filter, pilot gas, load, air temperature, gas temperature, temperature after compression, pressure reduction in a combustion chamber, blade position, gas turbine output, air temperature inflow, air pressure, pressure difference over air filter, pressure after compression stage, temperature after compression stage, inlet guide blade position, pressure difference in combustion chamber, pilot gas stream, gas pressure, gas temperature, rotational speed, and exhaust gas temperature.

3. The method according to claim 2, wherein the combustion process is represented by a variable that describes combustion chamber humming, and the variables that influence the combustion chamber humming variable are graphically represented.

4. The method according to claim 3, wherein the combustion process is represented by a variable that describes NOx emission, and the variables that influence the NOx emissions are graphically represented.

5. The method according to claim 4, wherein the combustion chamber humming variable is a target variable during training.

6. The method according to claim 5, wherein the variable describing the NOx emission is the target variable during training.

7. The method according to claim 6, wherein the trainable statistical model is a neural network, a causal network or a decision tree.

8. The method according to claim 7, wherein the neural network is a feed forward neural network.

9. The method according to claim 1 wherein the combustion chamber is a combustion chamber of a gas turbine.

10. The method according to claim 9, wherein a sensitivity analysis for influencing variables of a combustion process of a combustion chamber is performed.

11. The method according to 10, wherein a sequence of significance of variables influencing combustion chamber humming is determined.

12. The method according to claim 11, wherein a sequence of significance of variables influencing NOx emission of a combustion chamber is determined.

13. The method according to claim 1, wherein the pruning method is based on a statistical independence determined from the weights of the model.

14. A computer program for analyzing variables influencing a combustion process in a combustion chamber, the computer program compising a non-transitory computer useable medium including a computer readable program, wherein the computer readable program when executed on a computer causes the computer to perform a method comprising:
   computer code that trains a statistical model using predetermined values of influencing variables;
   computer code that alters parameters of the model such that the model describes the combustion process; and
   computer code that determines the influence of the altered parameters on the combustion process,
   wherein the model parameters are weights of the model, and
   wherein the variables are analyzed by a pruning method and a pruning of the model parameters is performed during the pruning method,
   wherein the pruning method comprising:
      representing each of the influencing variables by a node,
      providing a link between each of the nodes,
      determining a zero order statistical independence and dependence between two of the nodes,
      removing the link between the two nodes when a zero order statistical independence is determined between the two of the nodes;
      removing a link between a first node and a second node based on a first order statistical independence such that the link between the first node and the second node is removed when the first node is linked to a third node and the second node is linked to the third node.

15. The computer program according to claim 14, wherein the pruning method is based on a statistical independence determined from the weights of the model.

* * * * *